(12) United States Patent
Radacsi et al.

(10) Patent No.: US 11,450,860 B2
(45) Date of Patent: Sep. 20, 2022

(54) NANOFIBERS DECORATED WITH NANOPARTICLES AND METHODS OF THEIR MANUFACTURE

(71) Applicant: California Institute of Technology, Pasadena, CA (US)

(72) Inventors: Norbert Radacsi, Pasadena, CA (US); Konstantinos P. Giapis, Pasadena, CA (US)

(73) Assignee: California Institute of Technology

( * ) Notice: Subject to any disclaimer, the term of this patent is extended or adjusted under 35 U.S.C. 154(b) by 197 days.

(21) Appl. No.: 15/623,220

(22) Filed: Jun. 14, 2017

(65) Prior Publication Data
US 2018/0159139 A1    Jun. 7, 2018

Related U.S. Application Data

(60) Provisional application No. 62/350,117, filed on Jun. 14, 2016.

(51) Int. Cl.
*H01M 4/86* (2006.01)
*D06M 11/00* (2006.01)
(Continued)

(52) U.S. Cl.
CPC ........... *H01M 4/8663* (2013.01); *C08L 57/10* (2013.01); *C08L 71/00* (2013.01); *D01D 5/003* (2013.01);
(Continued)

(58) Field of Classification Search
CPC ............ H01M 4/8647; H01M 4/8652; H01M 4/8663; H01M 4/8803; H01M 4/665;
(Continued)

(56) References Cited

U.S. PATENT DOCUMENTS 8,425,986 B2    4/2013  Haile et al.
8,795,561 B2 *  8/2014  Scrivens ............... D04H 1/549
                                            264/211
(Continued)

FOREIGN PATENT DOCUMENTS

CN      101665232 B    11/2011
CN      102828260 A    12/2012
(Continued)

OTHER PUBLICATIONS

Merriam-Webster's dictionary's "ambient" page as published on May 24, 2016 [https://web.archive.org/web/20160524205411/http://www.merriam-webster.com:80/dictionary/ambient] (Year: 2016).*
(Continued)

*Primary Examiner* — Jeremiah R Smith
(74) *Attorney, Agent, or Firm* — KPPB LLP (57) ABSTRACT

Nanostructured materials, and methods and apparatus for their production are provided. Nanostructured materials comprise nanofibers having nanoparticles deposited along the outer surface thereof. The size of the nanofibers and nanoparticles, and the spacing of such nanoparticles along the nanofibers may be controlled over a wide range. Nanostructured materials may comprise a plurality of such nanofibers interwoven together to form fiber cloth-like materials. Many materials may be used to form the nanofibers including polymer nanofiber materials (e.g., polyvinyl alcohol (PVA) polyvinylpyrrolidone (PVP), etc.) along with compatible nanoparticle materials (e.g., salts or other crystallizable materials).

13 Claims, 9 Drawing Sheets

(51) Int. Cl.

| | |
|---|---|
| *D01F 1/10* | (2006.01) |
| *D01D 5/00* | (2006.01) |
| *H01M 4/90* | (2006.01) |
| *H01M 8/086* | (2016.01) |
| *C08L 57/10* | (2006.01) |
| *C08L 71/00* | (2006.01) |
| *H01M 4/88* | (2006.01) |
| *H01M 4/66* | (2006.01) |
| *B82Y 30/00* | (2011.01) |
| *B82Y 40/00* | (2011.01) |

(52) U.S. Cl.
CPC ............ *D01F 1/10* (2013.01); *D06M 11/00* (2013.01); *H01M 4/9075* (2013.01); *H01M 8/086* (2013.01); *B82Y 30/00* (2013.01); *B82Y 40/00* (2013.01); *C08L 2203/20* (2013.01); *C08L 2205/16* (2013.01); *D01D 5/0076* (2013.01); *H01M 4/665* (2013.01); *H01M 4/666* (2013.01); *H01M 4/8647* (2013.01); *H01M 4/8652* (2013.01); *H01M 4/88* (2013.01); *H01M 4/8803* (2013.01); *H01M 4/8842* (2013.01); *Y02P 70/50* (2015.11)

(58) Field of Classification Search
CPC ........ H01M 4/666; H01M 4/667; H01M 4/88; H01M 4/8842; C08L 57/10; C08L 71/00; C08L 2205/16; C08L 2203/20; B28Y 40/00
See application file for complete search history.

(56) References Cited

U.S. PATENT DOCUMENTS

| | | | | |
|---|---|---|---|---|
| 8,889,572 | B2 * | 11/2014 | Scrivens ................. | D01D 5/40 442/340 |
| 2006/0019819 | A1 * | 1/2006 | Shao-Horn .......... | D01D 5/0038 502/4 |
| 2009/0142253 | A1 * | 6/2009 | Nagata ..................... | C01B 32/50 423/460 |
| 2011/0151255 | A1 | 6/2011 | Kim et al. | |
| 2011/0262834 | A1 * | 10/2011 | Ito ......................... | H01M 4/881 429/482 |
| 2012/0100303 | A1 | 4/2012 | Kim et al. | |
| 2013/0280603 | A1 * | 10/2013 | Yoon ..................... | H01M 4/133 429/211 |
| 2016/0047062 | A1 * | 2/2016 | Greenawalt .......... | D01D 5/0069 264/465 |
| 2016/0111711 | A1 * | 4/2016 | Yoshikawa ............. | H01M 4/48 429/218.1 |
| 2017/0149068 | A1 * | 5/2017 | Papandrew ........... | H01M 4/926 |

FOREIGN PATENT DOCUMENTS

| | | |
|---|---|---|
| CN | 103255485 A | 8/2013 |
| JP | 2015081391 A | 4/2015 |
| WO | 2006108364 A1 | 10/2006 |
| WO | 2017218692 A1 | 12/2017 |

OTHER PUBLICATIONS

International Preliminary Report on Patentability for International Application PCT/US2017/037534, dated Dec. 18, 2018, dated Dec. 27, 2018, 10 Pgs.

International Search Report and Written Opinion for International Application No. PCT/US2017/037534, Search completed Oct. 25, 2017, dated Oct. 26, 2017, 12 pgs.

Bai et al., "Electrospinning method for the preparation of silver chloride nanoparticles in PVP nanofiber", Applied Surface Science, Jan. 18, 2008, vol. 254, pp. 4520-4523.

Chuangchote et al., "Electrospinning of Poly(vinyl pyrrolidone): Effects of Solvents on Electrospinnability for the Fabrication of Poly(p-phenylene vinylene) and TiO2 Nanofibers", Journal of Applied Polymer Science, Apr. 27, 2009, vol. 114, pp. 2777-2791.

Petrik et al., "Production Nozzle-Less Electrospinning Nanofiber Technology", Mater. Res. Soc. Symp. Proc., 2010. vol. 1240, 12 pgs.

Saquing et al., "Electrospun nanoparticle-nanofiber composites via a one-step synthesis", Small. Mar. 12, 2009, vol. 5, No. 8, pp. 944-951.

Urtiaga, "Caesium Dihydrogen Phosphate as Electrolyte For Intermediate Temperature Proton Exchange Membrane Water Electrolysis (IT-PEMWE)", Thesis, School of Chemical Engineering and Advanced Materials, Newcastle University, May 2014, 237 pgs.

Wang et al., "Facile Fabrication of Gold Nanoparticles-Poly(vinyl alcohol) Electrospun Water-Stable Nanofibrous Mats: Efficient Substrate Materials for Biosensors", ACS Appl. Mater. Interfaces, Mar. 12, 2012, 4, 1963-1971.

Wang et al., "Mesoporous Carbon Nanofibers With a High Surface Area Electrospun From Thermoplastic Polyvinylpyrrolidone", Nanoscale, Oct. 3, 2012, vol. 4, pp. 7199-7204.

Wang et al., "Needleless electrospinning for scaled-up production of ultrafine chitosan hybrid nanofibers used for air filtration", RSC Adv., Oct. 26, 2016, DOI: 10.1039/C6RA24557A, 10 pgs.

\* cited by examiner

NANOFIBERS DECORATED WITH NANOPARTICLES AND METHODS OF THEIR MANUFACTURE

CROSS-REFERENCE TO RELATED APPLICATIONS

This application claims priority to U.S. Patent Application No. 62/350,117, filed Jun. 14, 2016, the disclosure of which is incorporated herein by reference.

STATEMENT REGARDING FEDERALLY SPONSORED RESEARCH

This invention was made with government support under DE-AR0000495/T-109440 awarded by the Department of Energy. The government has certain rights in the invention.

FIELD OF THE INVENTION

The invention is generally directed to nanostructured materials comprising nanofibers having surface disposed nanoparticles and methods of their manufacture.

BACKGROUND

Nanotechnology requires efficient and inexpensive production of nano-objects, which must be kept apart to prevent merging and coalescence into larger objects devoid of nanoscale properties. This is particularly true for nanoparticles, which may have special optical, electrical, magnetic, and catalytic properties and do not exist in the bulk. Fabricating nanoparticles and supporting them so that merging and coalescence are prevented ensures taking advantage of nanoscale properties over long periods of time, important in commercial applications.

SUMMARY OF THE INVENTION

In many embodiments the invention is directed to nanofibers having nanoparticles disposed therein and on the surface thereof, and methods of their manufacture.

Some embodiments are directed to nanostructured precursor material including:
- at least one polymeric nanofiber having a dimension of at least less than 1000 nm, wherein the at least one polymeric nanofiber is laden with a solute, such that upon curing a plurality of crystalline salt nanoparticles are formed on the outer surface thereof; and
- wherein the nanoparticles have a particle size no greater than the diameter of the polymeric nanofiber.

In the above and other embodiments the polymeric nanofiber may have a diameter of less than 500 nm.

In the above and still other embodiments the polymeric nanofiber may be formed of at least one polymer selected from PVP, PVA, PMMA and PEG.

In the above and yet other embodiments the solute may be a crystalline salt.

In the above and still yet other embodiments the nanostructured materials may form a fuel cell electrode.

In the above and still yet other embodiments the fuel cell electrode may have a polymeric material selected from the group consisting of PVP, PVA, PMMA and PEG; and the nanoparticle may be a salt.

Some other embodiments are directed to methods of preparing a nanostructured material including:
- preparing a single-phase solution comprising a polymeric material, a solute, and at least one solvent;
- extracting polymeric nanofibers from the solution, wherein the polymeric nanofibers have solute disposed at least one of the surface or interior of the nanofiber;
- solidifying the extracted polymeric nanofibers; and
- curing the polymeric nanofibers such that the solute is nucleated into a plurality of crystalline solute nanoparticles disposed along the surface of the solidified nanofiber.

In the above and other embodiments the curing may be conducted at ambient conditions.

In the above and still other embodiments the solute may be a salt.

In the above and yet other embodiments the salt is CDP.

In the above and still yet other embodiments the polymeric material may be selected from the group consisting of PMMA, PEG, PVP and PVA.

In the above and still yet other embodiments the method may further include varying the concentration of polymeric material in the solution to control the nanoparticle size and the density of nanoparticles disposed on the nanofiber.

In the above and still yet other embodiments the polymeric material may be PVP and the concentration of polymeric material in the solution may vary from 25-45 mg/m L.

In the above and still yet other embodiments the polymeric material may be PVA and the concentration of polymeric material in the solution may vary from 15-30 mg/m L.

In the above and still yet other embodiments the concentration of solute in the solution may vary from 30-50 mg/mL.

In the above and still yet other embodiments the polymeric material may be PVP, the solute may be CDP, and the concentration of the solute in solution may be around 50 mg/mL.

In the above and still yet other embodiments the polymeric material may be PVA, the solute may be CDP, and the concentration of solute in solution may be around 30 mg/mL.

In the above and still yet other embodiments the nanofibers may be solidified on a substrate heated between about 110 to 140° C.

In the above and still yet other embodiments the polymeric nanofibers may be extracted using a process selected from the group consisting of electrospinning and meltblowing.

In the above and still yet other embodiments the method may further include interweaving a plurality of solidified nanofibers together.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings and data, nanostructured materials, and methods and apparatus for their production are provided. Many embodiments of nanostructured materials comprise nanofibers decorated with nanoparticles, e.g., having nanoparticles formed along the outer surface thereof. Although the size of the nanofibers and nanoparticles, and the spacing of such nanoparticles along the nanofibers may be controllably varied, in various embodiments the nanofibers may have a short dimensional size scale of from 50 to 1000 nm and a long dimensional size scale of from tens of micrometers to millimeters. Likewise, the nanostructured materials may have diameters of from 100 to 300 nm. It will be understood that these parameters may be minutely controlled such that nanofiber length, diameter and nanoparticle size may all be engineered as desired. In other embodiments, nanostructured materials may comprise a plurality of such nanofibers interwoven together to form fiber cloth-like materials. Many materials may be used to form the nanofibers according to embodiments. In some such embodiments, a polymer nanofiber material (e.g., polyvinyl alcohol (PVA) or polyvinylpyrrolidone (PVP)) may be used along with a compatible nanoparticle material (e.g., salt or other crystallizable material).

Various other embodiments are directed to methods and apparatus for forming nanostructured materials in accordance with embodiments. In various such embodiments, the process may comprise forming a solution containing a solvent, a crystallizable solute (e.g., a salt), and a liquid polymer material capable of forming a nanofiber (e.g., by electrospinning). Although a wide variety of polymer and solute materials (e.g., water-soluble, hydrophobic, etc.) may be used in associate with such a process, embodiments use a combination of solvent, polymer and nanoparticle solute capable of forming a single-phase solution. Likewise, a wide-variety of methods for forming nanofibers from the solidification of such solutions may be used to form such nanostructured materials. In some such embodiments an electrospinning process may be used. In various such embodiments the length and diameter of the nanofiber as well as the mean diameter of the nanoparticles appended thereto may be controlled by tuning the collector bias and/or the electrospinning voltages, as well as the viscosity and conductivity of the solution.

Accordingly, as discussed in relation with embodiments, new nanostructured materials and methods of creating nanostructured materials are provided capable of forming very high surface area composite materials with supported nanoparticles having controlled nanoparticle size. Such materials and methods have application in fuel cells, batteries, and other devices that require high surface area electrodes or membranes. Applicants also include the fabrication of pharmaceuticals as nano-sized pharmaceuticals have higher dissolution rate, therefore higher bioavailability than conventional, micron-sized ones. Nanoparticle decorated nanostructured materials may also be used for biosensor applications by attaching nanoparticles of biological interest to carrier nanofibers.

Definitions

For the purposes of this disclosure, the term "nanostructured material" refers to a structure in which at least a portion of the structure displays nanometer level dimensions, e.g., having at least one dimension of between 1 to 1000 nm.

For the purposes of this disclosure, the term "nanoparticle" refers to a small solid substance (spherical or not) with high surface-to-volume ratio, which has an average size (diameter) of between 1 to 500 nm.

For the purposes of this disclosure, the term "nanofiber" refers to a solid substance that has one dimension significantly larger than the other two dimensions with an aspect ratio of at least 10.

For the purposes of this disclosure, the term "substrate" refers to any material onto which the electrospun nanofibers can be deposited and the nanostructured material can be formed, examples include, but are not limited to metals and carbon paper.

For the purposes of this disclosure, the term "aqueous solution" refers to a solution containing water. The aqueous solution can also include water miscible solvents that include, but are not limited to, alcohols, DMSO, DMF, tetrahydrofuran, and others.

For the purposes of this disclosure, the term "alcohol" refers to a C1-6 alkyl having from 1 to 3 hydroxyl groups. Exemplary alcohols include, but are not limited to, methanol, ethanol, propanol, isopropanol, butanol, isobutanol, sec-butanol, tert-butanol, pentanol, hexanol, ethylene glycol and glycerol. Other alcohols include C1-4 alkyl, C1-3 alkyl, C1-2 alkyl and C1 alkyl with a single hydroxyl group.

For the purposes of this disclosure, the term "cure" or "curing" refers to a process by which the solute dispersed within or on a nanofiber is permitted to diffuse and nucleate into a plurality of nanoparticle crystals at the surface of the nanofiber. Curing may refer to an active process such as drying via stir drying and/or heating, and the application of humidified air, etc. Curing may also refer to a passive process, such as resting the nanofiber until nucleation occurs via natural drying, etc.

Embodiments of Nanostructured Materials

Figure 1:
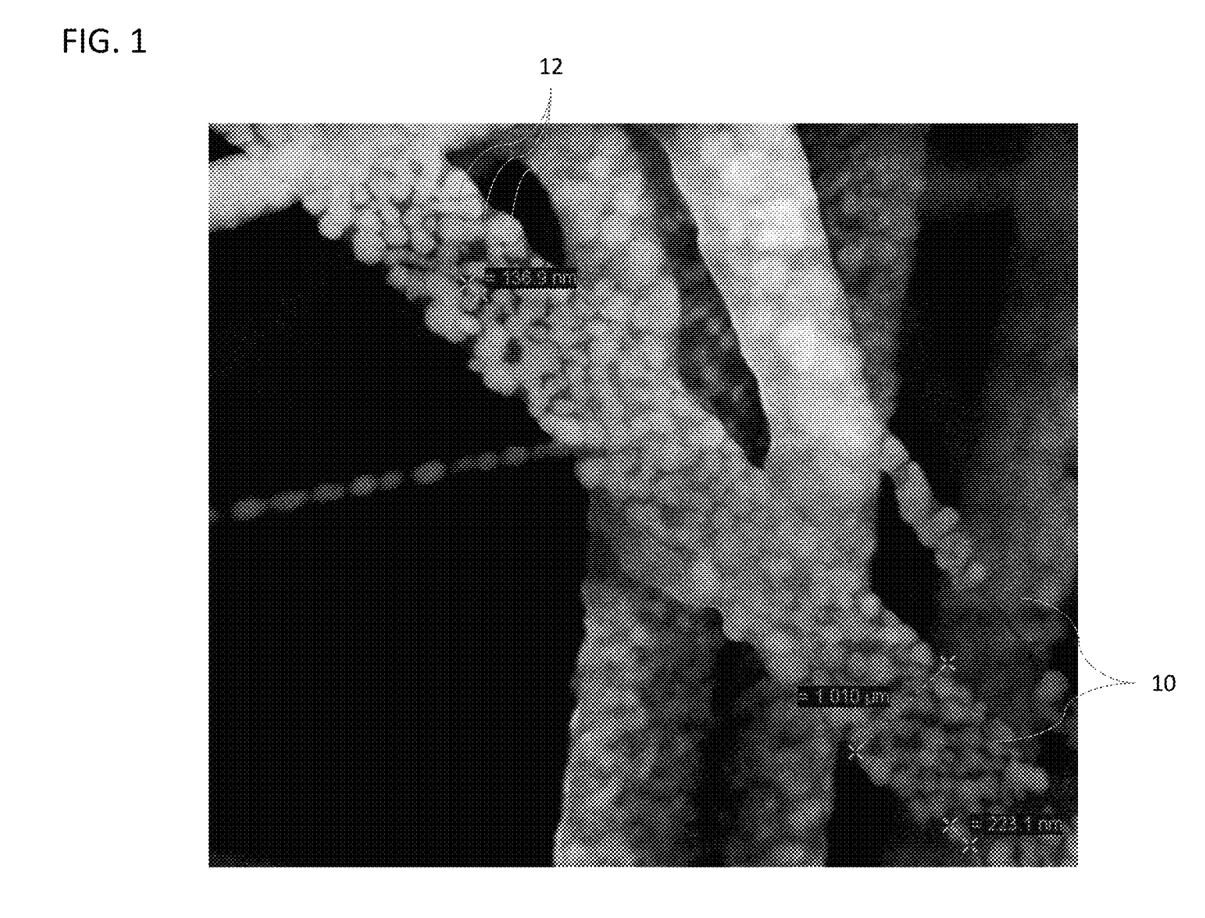
FIG. 1 provides an image of a nanostructured material according to embodiments.

Many embodiments of the invention are directed to nanostructured materials comprising one or more nanofibers having nanoparticles disposed thereon. An image of an exemplary nanostructured material according to embodiments is provided in FIG. 1. As shown, in such exemplary embodiments the nanostructured material may comprise at least one nanofiber (10) having a plurality of nanoparticles (12) disposed on the outer surface thereof. Although multiple nanofibers are shown in the figure, it should be understood that the nanostructured material may include one or a plurality of fibers, and that these fibers may be isolated or interwoven to form sections of material.

Although nanostructured materials having particular dimensions are shown in the figures, it will be understood that the physical dimensions of nanostructures according to embodiments can be controllably varied. In various embodiments, the shortest dimension of a nanostructure is, by definition, in the nanometer range and is typically from about 1 nm to less than 1000 nm. In various other embodiments, the longest dimension can range from tens of nanometers to a macroscopic scale in the range of millimeters. In some embodiments, the nanostructured materials of the present invention can have diameters from 100 to 300 nm. Similarly, the nanoparticles disposed on the surface of the nanofibers of the nanostructured material can each have at least one dimension of from 1 to 1000 nm. Each of these parameters can be minutely controlled using methods according to embodiments.

Finally, it will be understood that the nanostructured materials according to embodiments may be formed of a wide-variety of materials. The nanofiber may be formed of any polymeric material capable of being formed into nanofibers using solution-based techniques, such as, for example, electrospinning, etc. Examples of such materials may include, for example, water-soluble or hydrophobic, biocompatible and other materials. Examples of suitable materials include, but are not limited to, Poly(vinyl alcohol) (PVA), polyvinylpyrrolidone (PVP), poly(methyl methacrylate) (PMMA), and polyethylene glycol (PEG). Similarly, the nanoparticles may be formed from any crystalline material compatible with a solution comprising the selected polymer. In many embodiments, the crystalline materials take the form of a salt. Examples of suitable salt materials include, but are not limited to $CsH_2PO_4$ (CDP), metal salts, etc. Regardless of the nanofiber polymeric material and nanoparticle material chosen, it will be understood that they must be soluble into a single-phase solution, either by a single common solvent or multiple solvents.

Embodiments of Methods for Forming Nanostructured Materials

Figure 2:
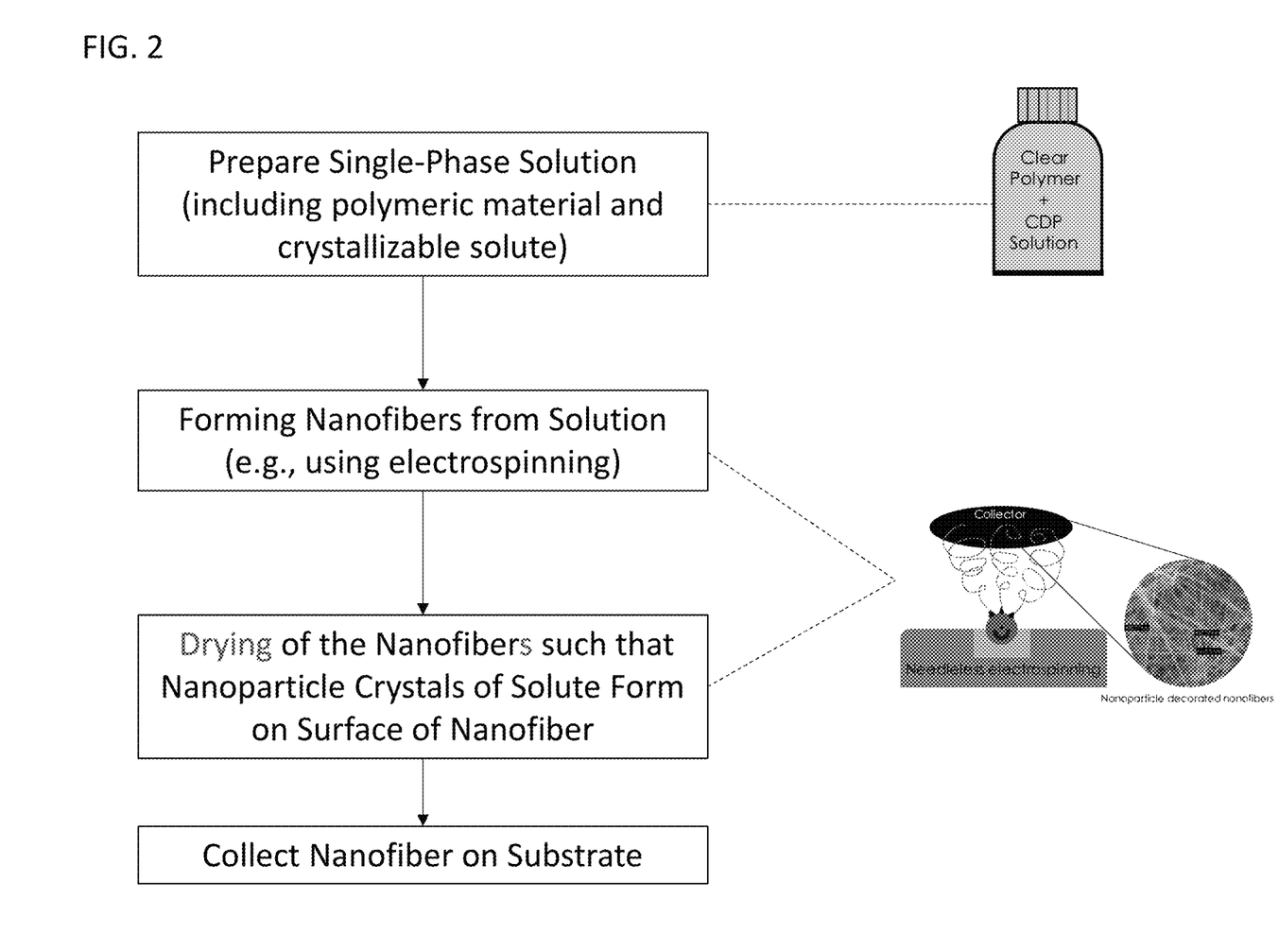
FIG. 2 provides a flowchart of a method for forming nanostructured materials according to embodiments.

Embodiments are also directed to methods of forming nanostructured materials. FIG. 2 provides a flowchart of one such embodiments. As shown, the process entails the selection of a nanostructure forming material system comprising at least one polymeric material capable of forming nanofibers, at least one crystallizable solute capable of forming nanoparticles, and one or more solvents capable of placing both the polymeric material and the crystallizable solute into a single-phase solution, e.g., not a suspension. Once a solution of a desired concentration of polymeric material and solute is obtained, nanofibers are formed using a suitable solution based technique, such as, for example, electrospinning. It will be understood that any suitable combination of polymeric material, solute and solvent may be used such that a single-phase solution is formed from the component. Specific examples of suitable single-phase solutions capable of forming nanostructured materials are provided in the examples below.

Once a single-phase solution is formed, many embodiments employ a nanofiber forming technique capable of forming nanofibers from the solution and depositing the nanofibers on a suitable substrate. In many embodiments the nanofiber forming technique may include electrospinning techniques (nozzle-free or with nozzle). In such techniques the nanofibers formed from the solutions may be at least partially dried prior to deposition on the substrate, such as, for example, by solvent evaporation (e.g., passively or by active drying, such as through heated air). The substrate may include any material suitable for collecting the formed nanofibers. Exemplary substrate materials include, for example, metals, composites, carbon, etc. Although not essential, the substrate may be heated to allow for more facile drying. In embodiments, where the substrate is heated it may be heated above the boiling point of the solvent or solvents (e.g., water, alcohol, etc.). In many embodiments, the substrate may be heated to a temperature of around 110-140° C.

Regardless of the specific nanofiber forming technique used, the technique is configured such that the nanofibers formed contain the solute disposed within the bulk thereof and/or on the surface thereof. During the formation, drying and later curing of the nanofibers, the solute is drawn out of the bulk and/or from the surface to form a plurality of nanoparticles formed from crystals of the solute on the surface of the nanofiber.

Although not to be bound by theory the process of drawing the solute from the nanofiber to nucleate and form the nanocrystals thereon involves the transport of the solute into nucleated crystals. This may occur by dissolution of the solute into nanopores of the polymer nanofiber surface (e.g., by incomplete drying which leaves solvent in the fiber, or by solvent supplied from the ambient air during curing of the fibers). Regardless of how the solute is disposed within the surface pores of the nanofiber, it has been discovered that, in accordance with embodiments, the dissolved solute will outdiffuse through the pores onto the surface of the nanofiber where evaporation allows for the nucleation and growth of the nanocrystals.

In some embodiments, different solvents with different boiling points may be used for the polymeric material and the nanoparticle solute. Although not to be bound by theory in such embodiments, as the solvent for the polymer (e.g., alcohol for PVP) boils off the liquid fiber solidifies first (e.g., in the above example PVP is formed first). This would still leave a film of the second solvent around the fibers (e.g., a water-DMF). As the temperature of the nanofiber rises and water evaporates, the film breaks up, forming liquid islands on the nanofiber surface. Once supersaturation reaches its maximum, there is a driving force for nucleation from the liquid solution islands, and nanoparticles are formed on the fiber surface (e.g., via heterogeneous nucleation). In many embodiments, the nanoparticles may be formed from a crystallizable salt such as CDP). In the exemplary solution described (e.g., a CDP/water-DMF solution) the DMF is an anti-solvent for CDP, thus it promotes its crystallization.

Regardless of the specific mechanism, as the nanofiber containing the solute dries and cures, diffusion and evaporation allows the solvent(s) to be boiled away allowing for the nucleation and solidifying of the solute leaving nucleated islands of the solute material in the form of a plurality of nanoparticles on the surface of the nanofiber.

It is well known that techniques for forming nanofibers from solution (e.g., electrospinning and meltblowing) are capable of forming uniform nanofibers and that varying the concentration of the polymer in solution can be used to vary the nanofiber diameter. Although specific concentrations and operating conditions will be described in the examples below, in many embodiments it has been discovered that changing the polymer type and concentration can also be used to control the nanoparticle size and density in the nanostructured materials. For example, the polymer polyvinylpyrrolidone (PVP) gives a higher density of nanoparticles at the same polymer concentration than polyvinyl alcohol (PVA), and varying the concentration of either polymer can affect one or both of the density or size of nanoparticles. Accordingly, in many embodiments, a solute (e.g. CDP) concentration of between 30-50 mg/mL, and a polymeric (e.g., PVP) concentration of between 25-45 mg/mL may be used. In other embodiments, a polymeric material (e.g., PVA) concentration of between 15-30 mg/mL may be used.

In addition, changes in the nanofiber formation process, such as, for example electrostatic charge during electrospinning may be used to modify the nanofiber size, as will be known to those skilled in the art.

EXEMPLARY EMBODIMENTS

Experiments were conducted to demonstrate the capabilities of the methods in controllably forming and controlling the physical characteristics of nanostructured materials in accordance with embodiments. These results and discussion are not meant to be limiting, but merely to provide examples of operative devices and their features.

Example 1: Electrospinning Process

Figure 3A:
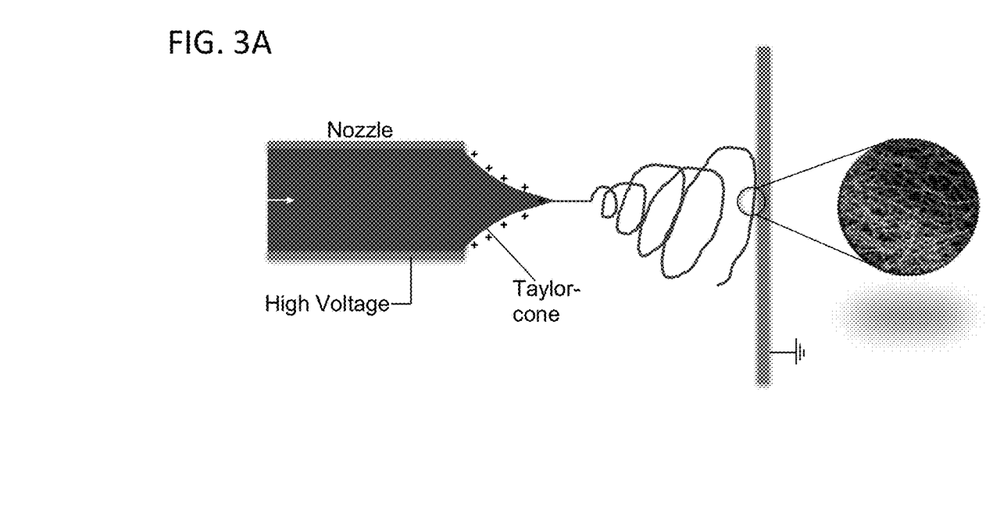
FIG. 3A provides a schematic of an electrospinning apparatus according to embodiments.
Figure 3B:
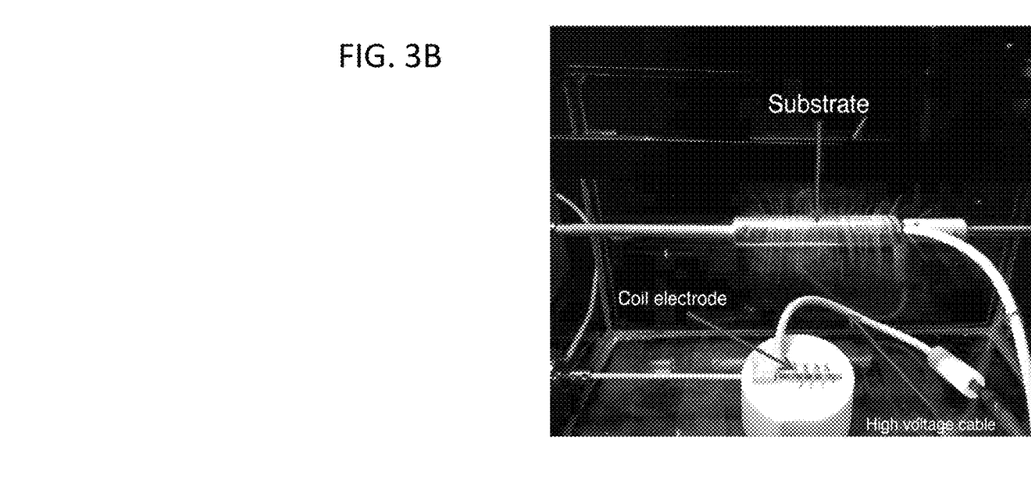
FIG. 3B provides an image of a nozzle-free electrospinning apparatus according to embodiments.

Electrospinning is an inexpensive and environmentally friendly technique that uses high voltage to draw very fine, typically nano-scale fibers from a liquid solution. Conventionally, high voltage is applied to a nozzle that has a conductive liquid flowing with a flow rate. In nozzle-free (needleless) systems, positive high voltage is applied on a rotating cylinder-shaped metal electrode that is partially immersed into bath, containing a polymer solution. When the applied electrostatic forces overcome the surface tension of the liquid film on the metal surface, one or more Taylor cones are formed, from which fluid jets are emitted towards the grounded or negatively biased collecting substrate. If the molecular cohesion of the liquid is sufficiently high instead of small droplets, fibers are emitted from the nozzle in a form of a jet. The electric field stretches the jets along a straight line, which is further elongated by a whipping process caused by electrostatic repulsion initiated at small bends in the fiber. (A schematic of this process is shown in FIG. 3A.) At a certain point due to evaporation, the supersaturation ratio will be high enough for the polymer in for phase transition and the jet solidifies into nanofibers. A figure showing an apparatus for such formation is provided in FIG. 3B.

Compared to electrospray deposition technique, nozzle-free electrospinning has significantly higher production rate, surface area and can provide a homogeneous product. Accordingly, in various exemplary embodiments, a needleless electrospinning technique was used to produce nanofibers from a viscous polymer solution. In such embodiments, a crystallizable salt (e.g., $CsH_2PO_4$) is added to the solution. In these embodiments, it is shown that using certain parameters nanoparticles of the $CsH_2PO_4$ are formed on the surface of the nanofibers.

In the studies, aqueous solutions were prepared as follows: 5 g CDP and 3-6 g PVP (molecular weight: 1.3 million) were dissolved in 50 mL DI water and 40 mL ethanol or methanol in separate bottles, respectively. In a third beaker 10 mg polyaniline was dissolved in 10 mL DMF. When all the three beakers showed clear solutions, they were mixed together. For the PVA solution preparation, 3 g CDP was dissolved first in 50 mL DI water, then 1.5 or 3 g PVA (high molecular weight) was added to the solution. Upon observing a clear solution, 40 mL methanol was added to it. In a different beaker 10 mg polyaniline was dissolved in 10 mL DMF, and added to the main solution.

Once the aqueous solutions were formed, a needleless electrospinning technique was used to spin the aqueous solution from the surface of a cylindrical electrode to the substrate onto a heated substrate.

Exemplary Formation of Nanostructured Materials

Figure 4:
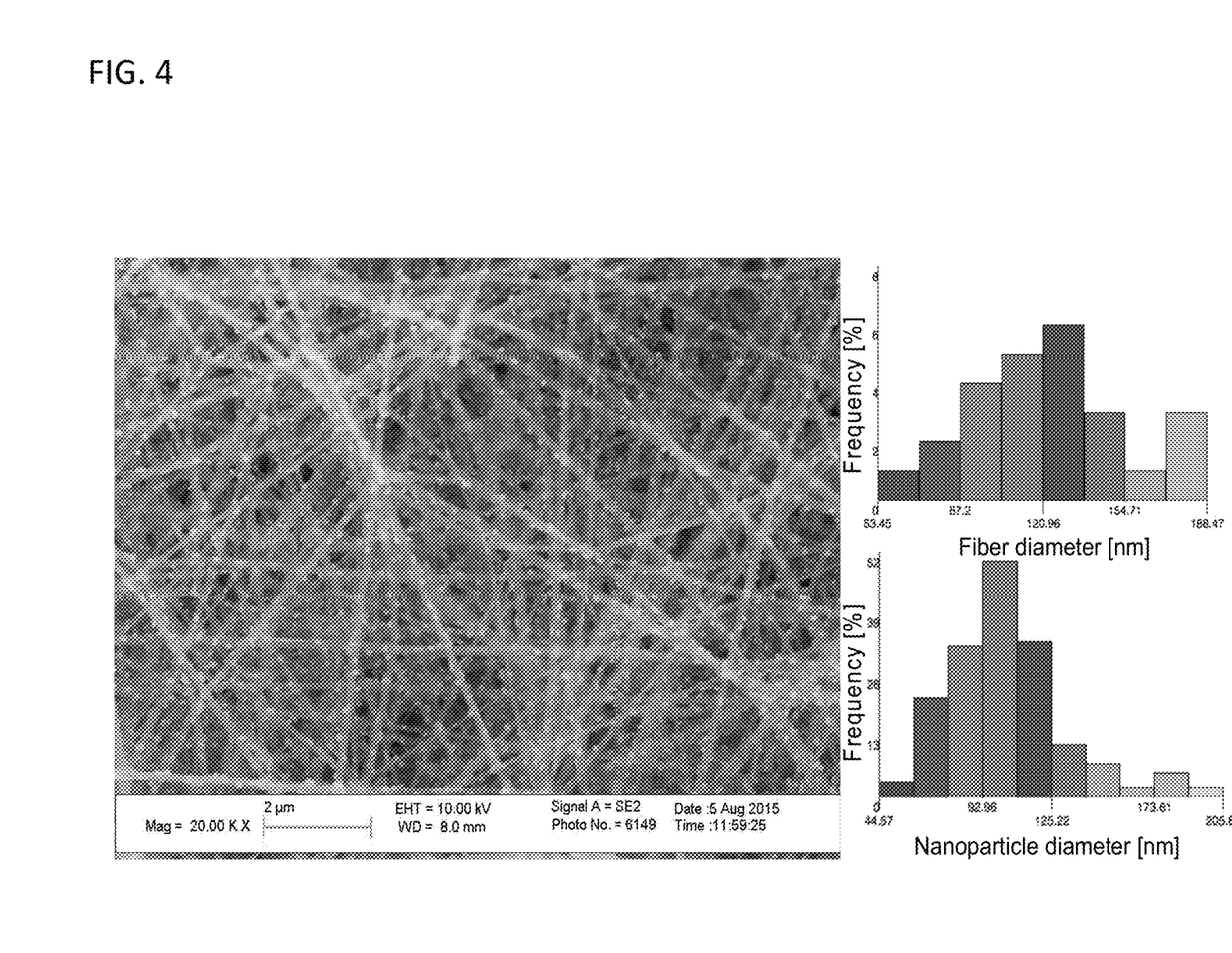
FIG. 4 provides an SEM image with histograms showing the formation of nanofibers having nanoparticles disposed along the surface thereof and the size and density of nanoparticles obtained using a method according to embodiments.

In one exemplary embodiment, a solution containing CDP in a concentration of 50 mg/mL and PVP in a concentration of 30 mg/mL are provided and subject to an electrospinning process where the rotating electrode is at +50 kV DC voltage, the collector substrate is at −5 kV DC voltage, and the distance between the top of the rotating electrode and collector is 130 mm. Hot air is blown onto the substrate, creating a temperature of 118° C. at the substrate interface. Exemplary data from such a process using PVP nanofibers and a CDP nanoparticle solute is shown in FIG. 4. The image provides an SEM of the nanostructured materials formed by the process. The graphs to the right shown the range of nanofibers and nanoparticle sizes formed using the process, with the mean diameter of the nanofibers being 123.9±32 nm, and the mean diameter of the nanoparticles being 104.5±28 nm. This example demonstrates that using a process according to embodiments it is possible to controllably form nanostructured materials comprising nanofiber supported nanoparticles.

Effect of Polymeric Concentration on Nanostructured Formation

It has also been identified that changing the polymer type and concentration can be used to control the nanoparticle size and density.

Figure 5:
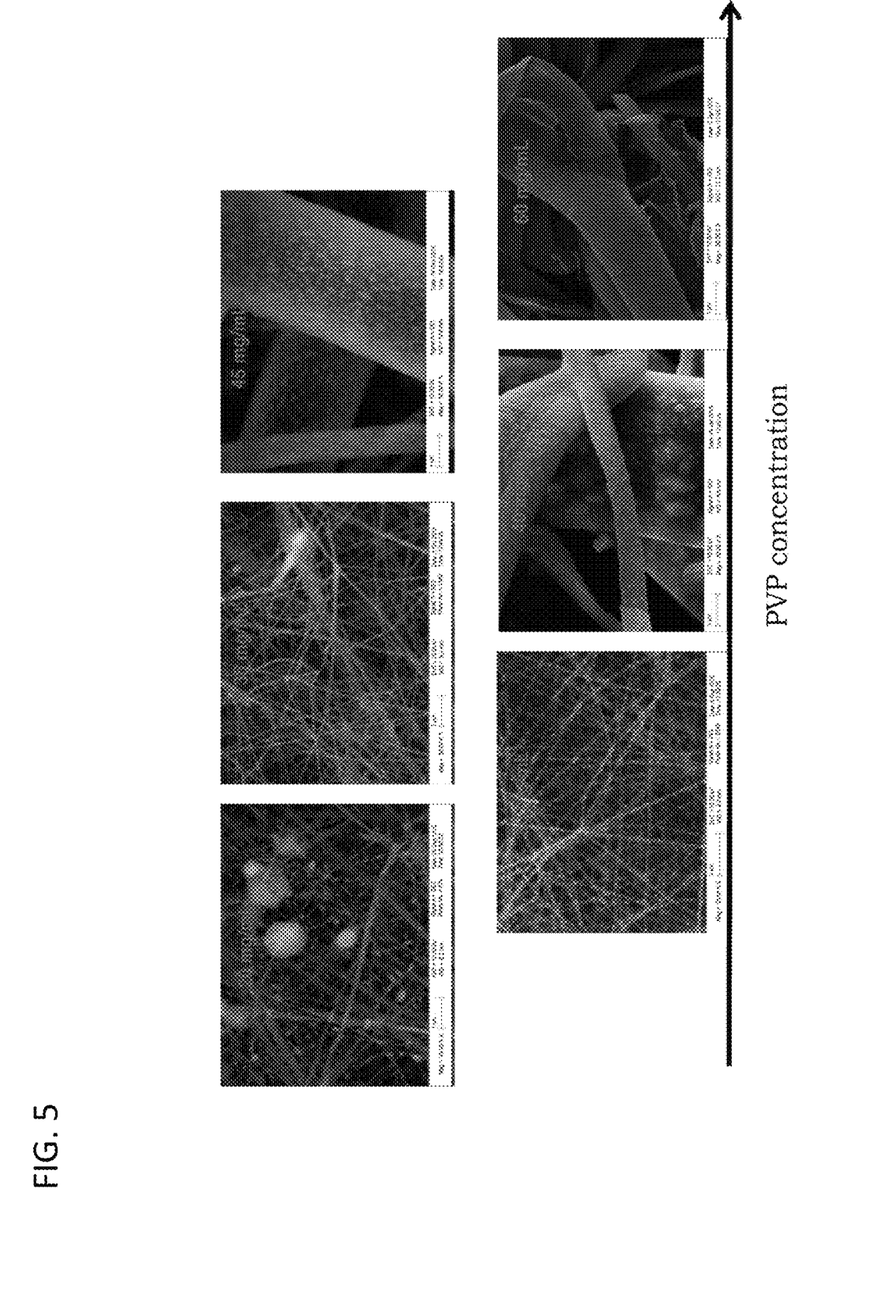
FIG. 5 provides SEM images demonstrating the dependence of the formation of nanostructured materials on PVP polymer concentration in accordance with embodiments.
Figure 6A:
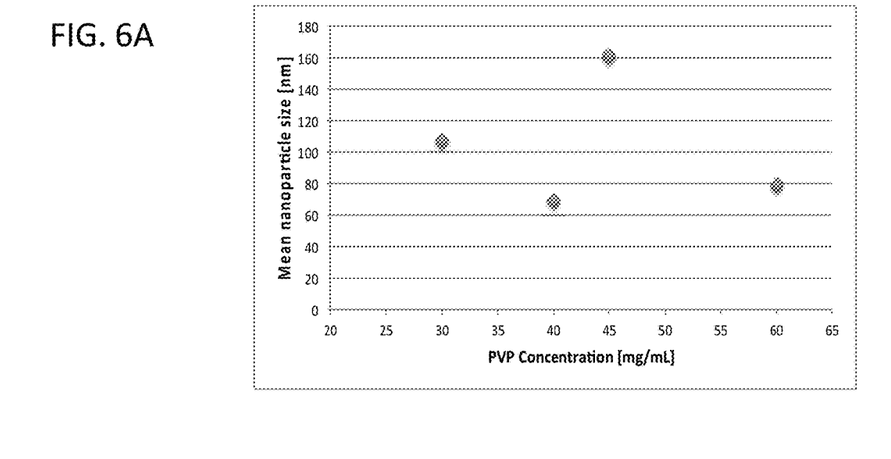
FIGS. 6A and 6B provide data plots demonstrating: 6A) nanoparticle size; and 6B) nanoparticle density as a function of polymer concentration in accordance with embodiments.
Figure 6B:
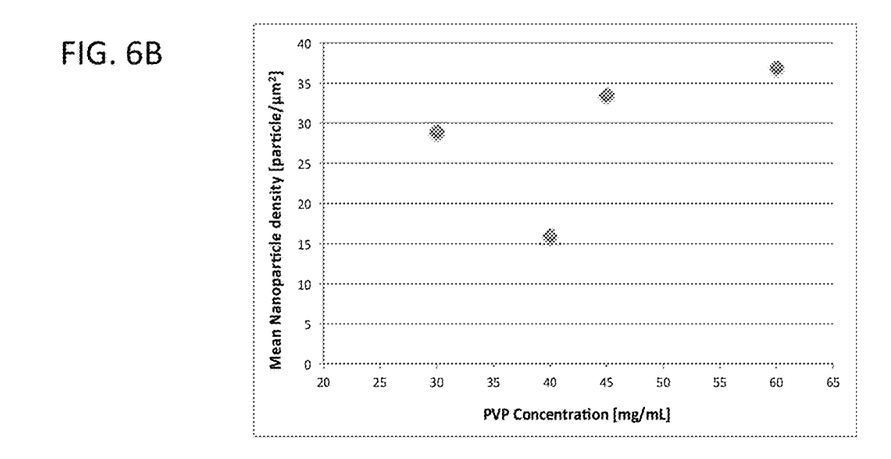

One exemplary embodiment studied the effect of polymeric concentration on the size and distribution of nanoparticles on the nanostructured material using a PVP material. In the study, CDP concentration was 50 mg/mL and PVP concentration was varied from 20 to 60 mg/mL. The rotating electrode was set at +50 kV DC voltage, the collector substrate at −5 kV DC voltage, and the distance between the top of the rotating electrode and collector was 130 mm. Hot air was blown on the substrate, creating a temperature of 118° C. at the interface. As shown in FIG. 5, with increasing concentration of PVP, the electrospun fiber diameter increases. The nanoparticle size and density on the fibers also increase. Above 30 mg/mL PVP concentration no polymer beads are present. The (nano)fiber diameter is the smallest at 30 mg/mL PVP concentration. Plots of the nanoparticle size and density versus PVP concentration are provided in FIGS. 6A and 6B.

Figure 7:
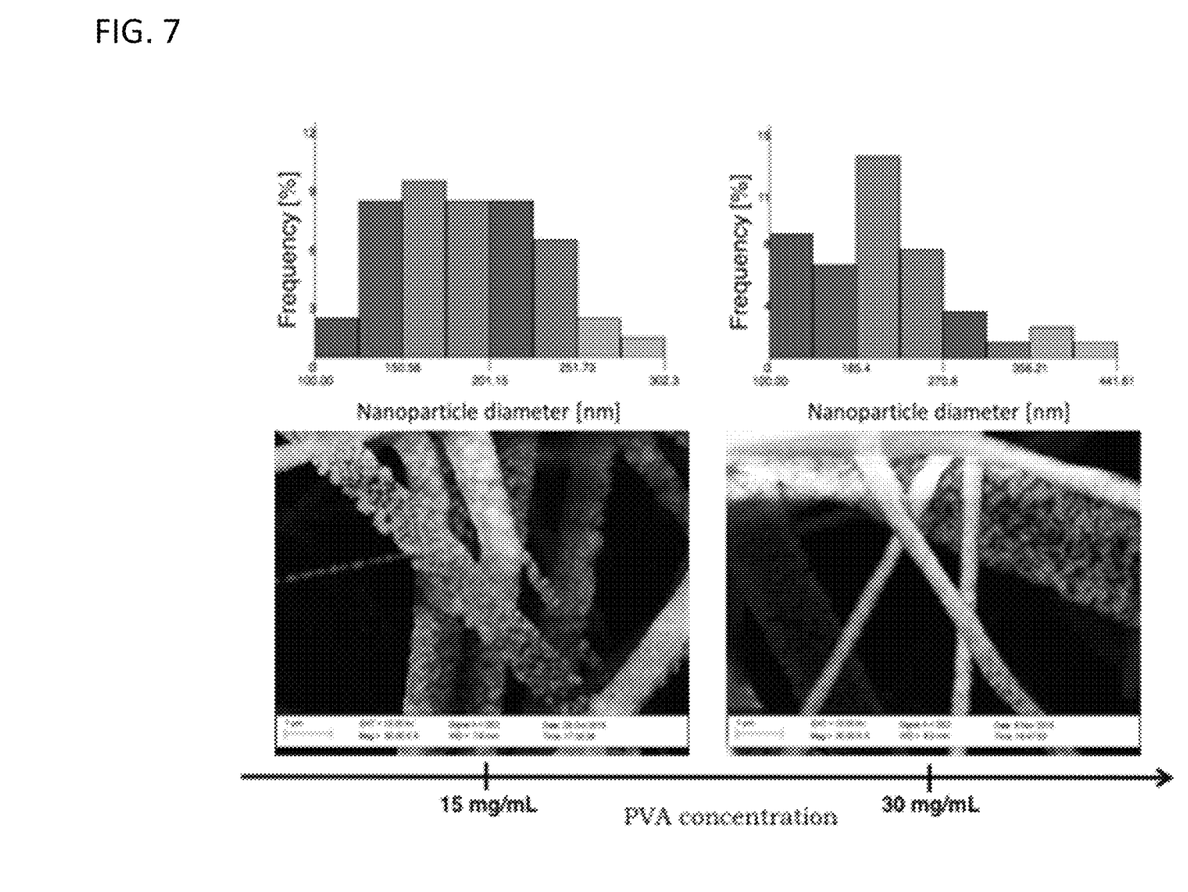
FIG. 7 provides SEM image with histograms showing the dependence of the formation of nanostructured materials on PVA polymer concentration in accordance with embodiments.

A similar study was conducted using a PVA polymeric material. In this embodiment, CDP concentration was 30 mg/mL and PVA concentration was varied from 15 to 30 mg/mL. The rotating electrode was immersed into the solution at +45 kV DC voltage, the collector substrate was at −5 kV DC voltage, and the distance between the top of the rotating electrode and collector was 140 mm. A heat gun directed on the substrate provided hot air that heated the substrate to 140° C. As shown in FIG. 7A, the mean nanoparticle size at 15 mg/mL PVA concentration is 188.5±43 nm, and the nanoparticle density is 28 particles/$\mu m^2$, whereas at a 30 mg/mL PVA concentration, the mean nanoparticle size is 218±69 nm, and the nanoparticle density is 17 particles/$\mu m^2$.

In summary, the effect of the concentration of different solute materials were investigated to produce the CDP-PVP composite electrodes. Both the cesium dihydrogen phosphate (CDP) and the dissolved polymer concentration effects were studied on the nanostructure morphology and production rates of the process. Eleven different Polyvinylpyrrolidone (PVP) concentrations: 12, 15, 20, 25, 27, 29, 30, 33, 35, 45, 60 and 80 mg/mL, two different Polyvinyl alcohol (PVA) concentrations: 15 and 30 mg/mL, and five different CDP concentrations: 10, 25, 35, 50 and 70 mg/mL were tested. The results identify that changing the polymer type and concentration effect the nanoparticle size and density. Changes in polymer identity also affect the nanoparticle formation: the polymer PVP gives higher density of nanoparticles than PVA at the same concentrations.

Accordingly, these studies indicate that varying the concentration of the polymeric material can allow for the control of the density, and in some instances the particle size of the nanoparticle in the structure nanomaterials according to embodiments.

Effect of Polymeric Concentration on Nanostructure Formation

In addition to the polymer concentration and identity, the conditions for formation were also studied to determine whether they can be used to control the formation of nanoparticles on the nanofibers. In one exemplary study a clear solution of 50 mg/mL CDP and 80 mg/mL PVP was formed and electrospun at a 100 mm distance between the collector and the nozzle tip, and 0.25 mL/h flow rate at a potential difference of from 9 kV to 14 kV. The studies indicated that nanoparticles were formed on the polymer nanofibers at potential differences up to 10 kV (e.g, 9-10 kV), but smooth fiber surfaces without nanoparticles were obtained at 14 kV. Accordingly, potential difference may also be used to control the formation of nanoparticles in accordance with embodiments.

Example 2: Fuel Cell Implementations

Fuel cells are electrochemical devices that convert the chemical energy in fuels into electricity without combustion. A fuel cell works by separating the electrons and protons of the reactant fuel at the anode, and forcing the electrons to travel though a circuit to the cathode, creating electric current. The components in a fuel cell that make this direct electrochemical conversion possible are an ion-conducting electrolyte membrane, a cathode, and an anode. Fuel cell operation requires electrodes with catalytic nanoparticles in contact with the electrolyte and the gaseous fuel supplied, or the exhaust gases produced.

One of the most promising intermediate temperature fuel cell is the solid acid fuel cell (SAFC) that offers the unique benefit of a truly solid electrolyte and provides significant system simplifications relative to phosphoric acid or alkaline fuel cells. The state-of-the-art electrolyte used currently is the salt $CsH_2PO_4$ (CDP). Despite their promise, large-scale application of this technology is limited by factors like electrolyte performance or electrode durability.

In SAFCs the electrocatalysis reactions are also limited to the triple phase boundaries (at which the electrolyte, catalyst and the gas phase are in contact and where the simultaneous and coordinated transport of electrons, ions, and gas molecules can occur). Maximization of the triple-phase surface area by using platinum (Pt) nanoparticles has not been realized because of the typically large size of the electrolyte particles. Recent successes in incorporating submicron $CsH_2PO_4$ (CDP) in SAFCs suggest that intimate mixing of nano-sized particles of the two components (electrolyte and catalyst) would dramatically enhance the contact area between the two phases. A composite electrode must further ensure continuous pathways for ion, electron and gas phase transport.

Nano-structuring fuel cell electrodes would be an important component in creating commercially viable fuel cells. These nanofibers are of great interest to fuel cells as their characteristic high surface area, due to their nano-sized diameters, provide great conductivity pathways in the electrolyte as it allows greater movement, due to the optimization of contact between the electrolyte and the passing ions. However, another limitation to the adoption of SAFCs has been problems with available methods of manufacture.

There are many ways to produce high surface area cathodes for SAFCs, like ball milling, electrospraying or spray drying. Electrospray deposition and spray drying techniques have also been recently identified for producing $CsH_2PO_4$. Electrospray deposition creates <100 nm electrolyte particles, while spray drying can produce particles down to around 250 nm. However, both techniques have production rate of $-1$ mg h$^{-1}$ cm$^{-2}$, thus scale up to industrial levels has been extremely challenging. Furthermore, both techniques use nozzles, and therefore suffer from nozzle clogging, and cannot be used continuously. And in both cases the submicron-sized particles are not immobilized, thus they form large agglomerates (around 10-30 μm). Nozzle-free electrospinning overcomes the clogging problem as it uses a rotating drum instead of a nozzle. The nozzle-free electrospinning technique also has significantly higher production rate than in electrospray and spray drying techniques.

Embodiments are now directed to the high-surface area nanostructured materials capable of formation using a wide-variety of techniques, including nozzle-free electrospinning, that may be used in SAFCs. It is also shown, that using such materials, the efficiency, catalytic activity and stability of fuel cells can be increased.

Figure 8:
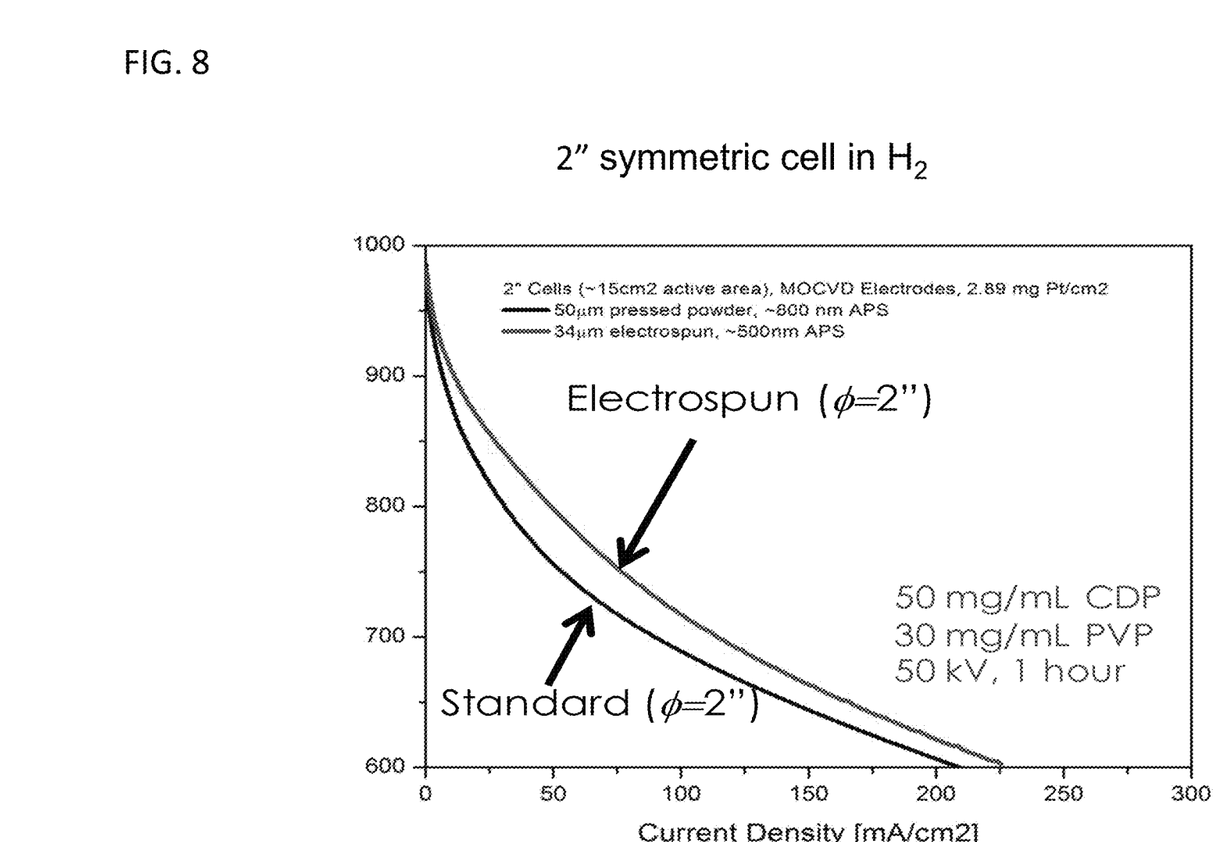
FIG. 8 provides a data graph showing cell voltage versus current density for a nanostructured material fuel cell electrode in accordance with embodiments.
Figure 9:
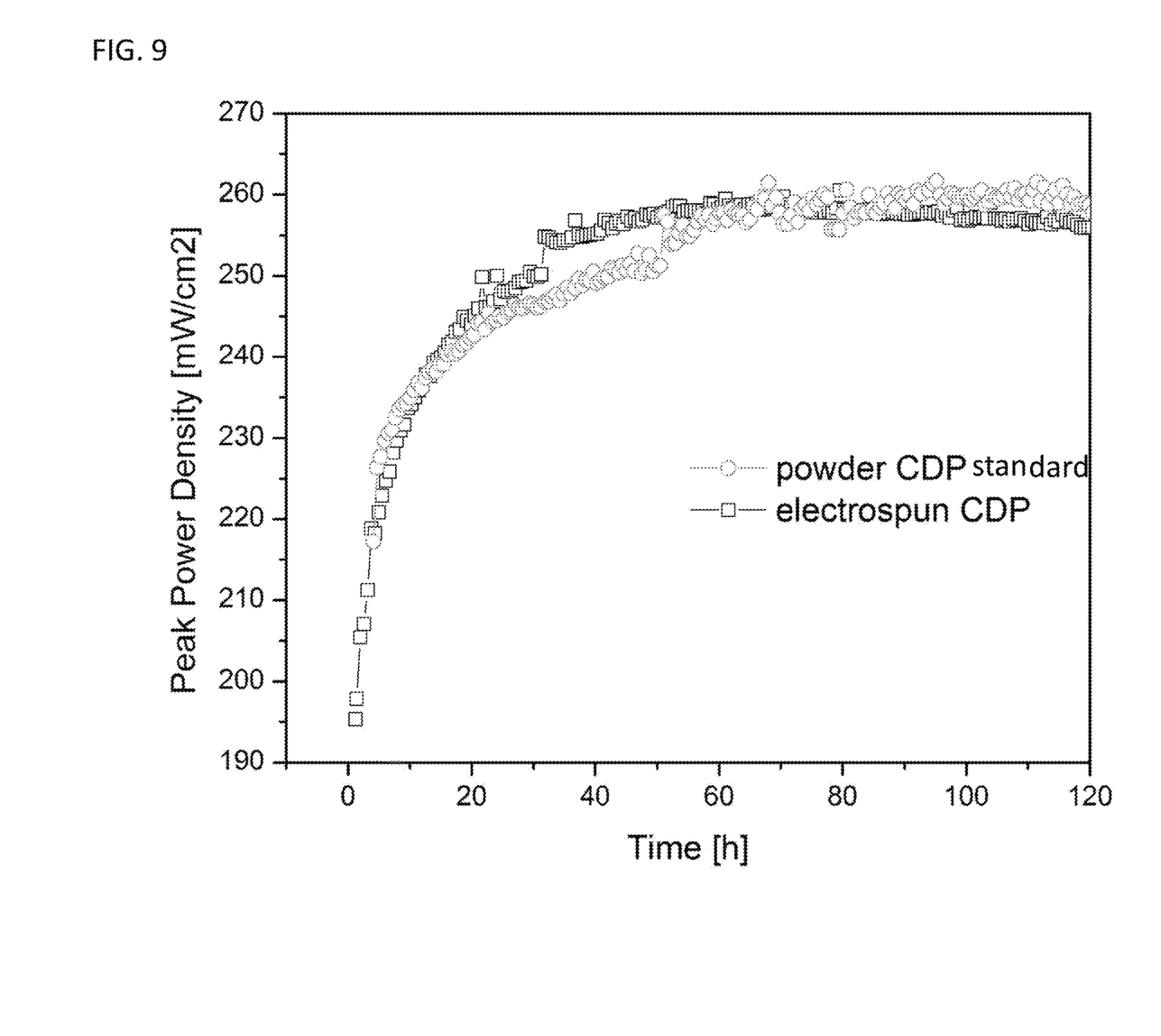
FIG. 9 provides a data graph showing peak power density for a nanostructured material fuel cell electrode in accordance with embodiments.

In one exemplary embodiment, a 2" diameter cell having an ~20 cm$^2$ active area and Pt nanoparticles on the electrodes was used as a test bed to compare the performance of fuel cells using conventional cathode materials and cathodes using nanostructured materials in accordance with embodiments. Specifically, a nanostructured material comprising a plurality of interwoven PVP nanofibers have CPD nanoparticles disposed on the surface thereof was formed using an electrospinning process in accordance with embodiments. The performance of this material was compared against the performance of a number of conventional materials, including pressed CDP powder and electrosprayed materials. Results for cell voltage vs. current density and peak power density over time are shown in FIGS. 8 and 9, respectively. These results are compared to the performance of standard sold acid fuel cell materials used in the industry.

These fuel cell test results show that using nanostructured materials for fuel cell cathodes in accordance with embodiments it is possible to form cells with very fast protonic conductivity, which is represented by the very low area-specific resistance, 20 mΩ-cm$^2$, and the cell voltage being improved at every current density compared to the state-of-the-art cell voltages produced by milling or spray drying.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of preparing a nanostructured material comprising solid electrolyte nanoparticles disposed along the surface of polymeric nanofibers, the method comprising:
    preparing a single-phase solution comprising a polymer material, a solute for forming the solid electrolyte nanoparticles, and at least one solvent;
    extracting polymeric nanofibers from the solution, wherein the polymeric nanofibers have solute disposed at least one of the surface or interior of the nanofiber;
    solidifying the extracted polymeric nanofibers; and
    curing the solidified polymeric nanofibers having solute disposed on at least one of the surface or interior thereof such that the solute is nucleated into a plurality of crystalline solid electrolyte nanoparticles disposed along the surface of the solidified polymeric nanofibers,
    wherein the curing is either a passive process, wherein the nucleation occurs via natural drying; or an active process, wherein the nucleation occurs in a condition selected from the group consisting of stir drying, heating, applying humidified air, and any combinations thereof; and
    wherein the method does not convert the polymeric nanofibers to carbon fibers.

2. The method of claim 1, wherein the solute is a salt.

3. The method of claim 2, wherein the salt is CDP.

4. The method of claim 3, wherein the concentration of solute in the solution varies from 30-50 mg/mL.

5. The method of claim 1, wherein the polymeric material is selected from the group consisting of PMMA, PEG, PVP and PVA.

6. The method of claim 5, wherein the polymeric material is PVP and the concentration of polymeric material in the solution varies from 25-45 mg/mL.

7. The method of claim 5, wherein the polymeric material is PVA and the concentration of polymeric material in the solution varies from 15-30 mg/mL.

8. The method of claim 1, further comprising varying the concentration of polymeric material in the solution to control the nanoparticle size and the density of nanoparticles disposed on the nanofiber.

9. The method of claim 1, wherein the polymeric material is PVP, the solute is CDP, and the concentration of the solute in solution is around 50 mg/mL.

10. The method of claim 1, wherein the polymeric material is PVA, the solute is CDP, and the concentration of the solute in solution is around 30 mg/mL.

11. The method of claim 1, wherein the nanofibers are solidified on a substrate heated between about 110 to 140° C.

12. The method of claim 1, wherein the polymeric nanofibers are extracted using a process selected from the group consisting of electrospinning and meltblowing.

13. The method of claim 1, further comprising interweaving a plurality of solidified nanofibers together.

* * * * *